United States Patent
Pan et al.

(10) Patent No.: US 11,372,417 B2
(45) Date of Patent: Jun. 28, 2022

(54) METHOD FOR PREDICTING EXITING INTERSECTION OF MOVING OBSTACLES FOR AUTONOMOUS DRIVING VEHICLES

(71) Applicant: Baidu USA LLC, Sunnyvale, CA (US)

(72) Inventors: Jiacheng Pan, Sunnyvale, CA (US); Kecheng Xu, Sunnyvale, CA (US); Hongyi Sun, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 258 days.

(21) Appl. No.: 16/712,287

(22) Filed: Dec. 12, 2019

(65) Prior Publication Data

US 2021/0181749 A1    Jun. 17, 2021

(51) Int. Cl.
| | |
|---|---|
| *G05D 1/02* | (2020.01) |
| *G08G 1/01* | (2006.01) |
| *G05D 1/00* | (2006.01) |
| *G08G 1/16* | (2006.01) |
| *G06N 3/04* | (2006.01) |
| *G06N 3/08* | (2006.01) |

(52) U.S. Cl.
CPC ......... *G05D 1/0214* (2013.01); *G05D 1/0088* (2013.01); *G05D 1/0221* (2013.01); *G06N 3/0445* (2013.01); *G06N 3/08* (2013.01); *G08G 1/0112* (2013.01); *G08G 1/166* (2013.01); *G05D 2201/0213* (2013.01)

(58) Field of Classification Search
CPC .. G05D 1/0214; G05D 1/0088; G05D 1/0021; G05D 2201/0213; G06N 3/0445; G06N 3/08; G08G 1/0112; G08G 1/166; B60W 60/00; B60W 60/00274; B60W 2420/00; B60W 2554/40
See application file for complete search history.

(56) References Cited

U.S. PATENT DOCUMENTS

| | | | |
|---|---|---|---|
| 2014/0278030 A1* | 9/2014 | Meena | G08G 1/015 701/118 |
| 2019/0170522 A1* | 6/2019 | Matsunaga | G08G 1/096827 |
| 2019/0225231 A1* | 7/2019 | Ohara | G06K 9/6289 |

\* cited by examiner

*Primary Examiner* — Rodney A Butler
(74) *Attorney, Agent, or Firm* — Womble Bond Dickinson (US) LLP

(57) ABSTRACT

A moving obstacle such as a vehicle within a proximity of an intersection and one or more exits of the intersection are identified. An obstacle state evolution of a spatial position of the moving obstacle over a period of time is determined. For each of the exits, an intersection exit encoding of the exit is determined based on intersection exit features of the exit. An aggregated exit encoding based on aggregating all of the intersection exit encodings for the exits is determined. For each of the exits, an exit probability of the exit that the moving obstacle likely exits the intersection through the exit is determined based on the obstacle state evolution and the aggregated exit encoding. Thereafter, a trajectory of the ADV is planned to control the ADV to avoid a collision with the moving obstacle based on the exit probabilities of the exits.

22 Claims, 10 Drawing Sheets

METHOD FOR PREDICTING EXITING INTERSECTION OF MOVING OBSTACLES FOR AUTONOMOUS DRIVING VEHICLES

TECHNICAL FIELD

Embodiments of the present disclosure relate generally to operating autonomous vehicles. More particularly, embodiments of the disclosure relate to predicting an exit of an intersection through which a moving obstacle likely exits the intersection.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In planning a path or trajectory for an autonomous driving vehicle (ADV), it is important to predict or determine movement of each moving obstacle within a proximity of the ADV. Such a prediction is difficult to achieve high accuracy, especially in predicting an exit of an intersection through which a moving obstacle may exit the intersection. Within the intersection, there may be several possible exits for the moving obstacle to exit. Since an actual path for the moving obstacle may be also influenced by other factors such as surrounding lanes and all other moving obstacles within the intersection, it is difficult to predict which exit of the exits the moving obstacle may select.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
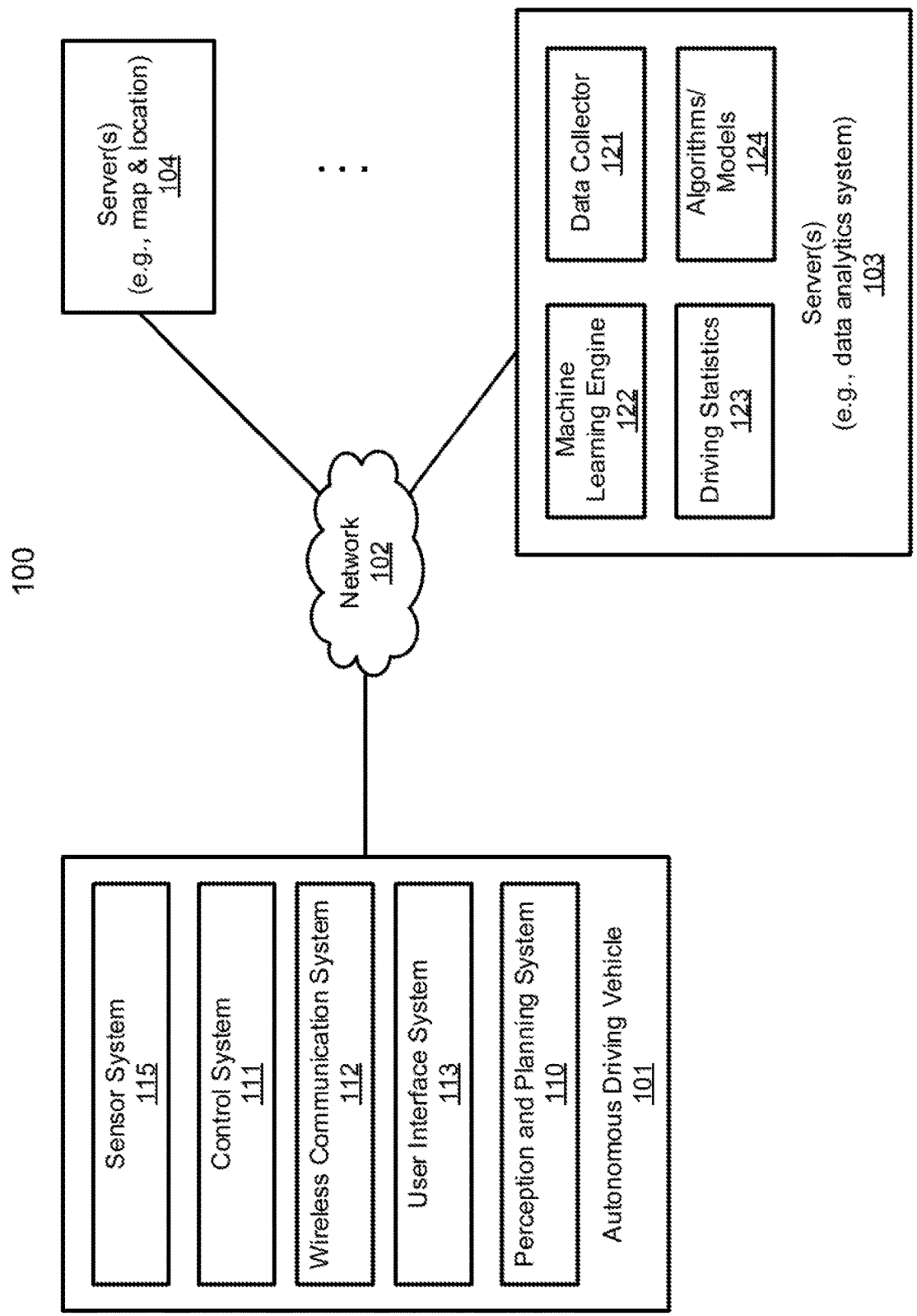
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a moving obstacle such as a vehicle is identified near an intersection with one or more exits. Features about the moving obstacle (with motion history) and features about intersection exits may be obtained. Not only each single exit's feature but the features of all possible exits are aggregated together. An exit probability of each exit that the moving obstacle likely exits through the exit may be determined based on the features about the moving obstacle and the aggregated features of all possible exits. By aggregated the features of all possible exits, the exit probability of each exit may be predicted accurately.

According to one embodiment, a moving obstacle such as a vehicle (or bicycle, pedestrian) within a proximity of an intersection and one or more exits of the intersection are identified. An obstacle state evolution of a spatial position of the moving obstacle over a period of time is determined. For each of the one or more exits, an intersection exit encoding of the exit is determined based on one or more intersection exit features of the exit. An aggregated exit encoding based on aggregating all of the intersection exit encodings for the one or more exits is determined. For each of the one or more exits, an exit probability of the exit that the moving obstacle likely exits the intersection through the exit is determined based on the obstacle state evolution and the aggregated exit encoding. Thereafter, a trajectory of the ADV is planned to control the ADV to navigate through the intersection to avoid a collision with the moving obstacle based on the exit probabilities of the one or more exits of the intersection. The above process is iteratively performed for each of the moving obstacles detected within the proximity of the intersection.

In one embodiment, for each of the one or more exits, the intersection exit encoding of the exit may be determined based on one or more exit features of the exit. For each of the one or more exits, the one or more exit features may include a shape, or an angle of the exit, a direction of the exit, a starting point of the exit, or a few lane points of the exit.

In one embodiment, the obstacle state evolution of the spatial position of the moving obstacle over the period of time may be determined by using recurrent neural network (RNN). In one embodiment, for each of the one or more exits, where the intersection exit encoding of the exit may be determined by using RNN.

In one embodiment, for each of the one or more exits, an overall exit encoding of the exit may be determined based on the intersection exit encoding of the exit, the aggregated exit encoding, and the obstacle state evolution. For each of the one or more exits, the exit probability of the exit may be determined further based on the overall exit encoding of the exit. In one embodiment, for each of the one or more exits, an attention score of the exit may be determined based on at least one of the intersection exit features of the exit, or the intersection exit encoding of the exit. The aggregated exit encoding may be based on a weighted sum of the intersection exit encoding for each of the one or more exits, where a weight for each of the one or more exits may be based on the attention score of the exit.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
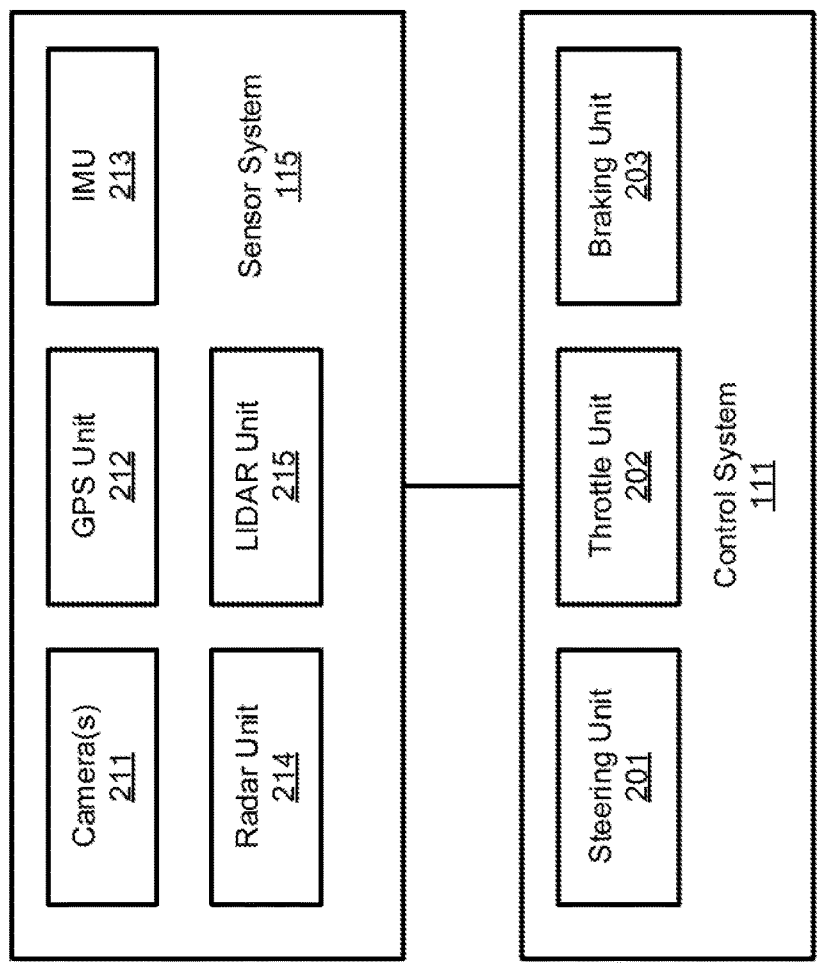
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to a moving obstacle within a proximity of an intersection and one or more exits of the intersection, an algorithm to determine an obstacle state evolution of a spatial position of the moving obstacle over a period of time, an algorithm to determine an aggregated exit encoding based on aggregating an intersection exit encoding for each of the one or more exits, and/or an algorithm or predictive model to determine, for each of the one or more exits, an exit probability of the exit that the moving obstacle likely exits the intersection based on the obstacle state evolution and the aggregated exit encoding. Algorithms 124 can then be uploaded on ADVs to be utilized during autonomous driving in real-time.

Figure 3A:
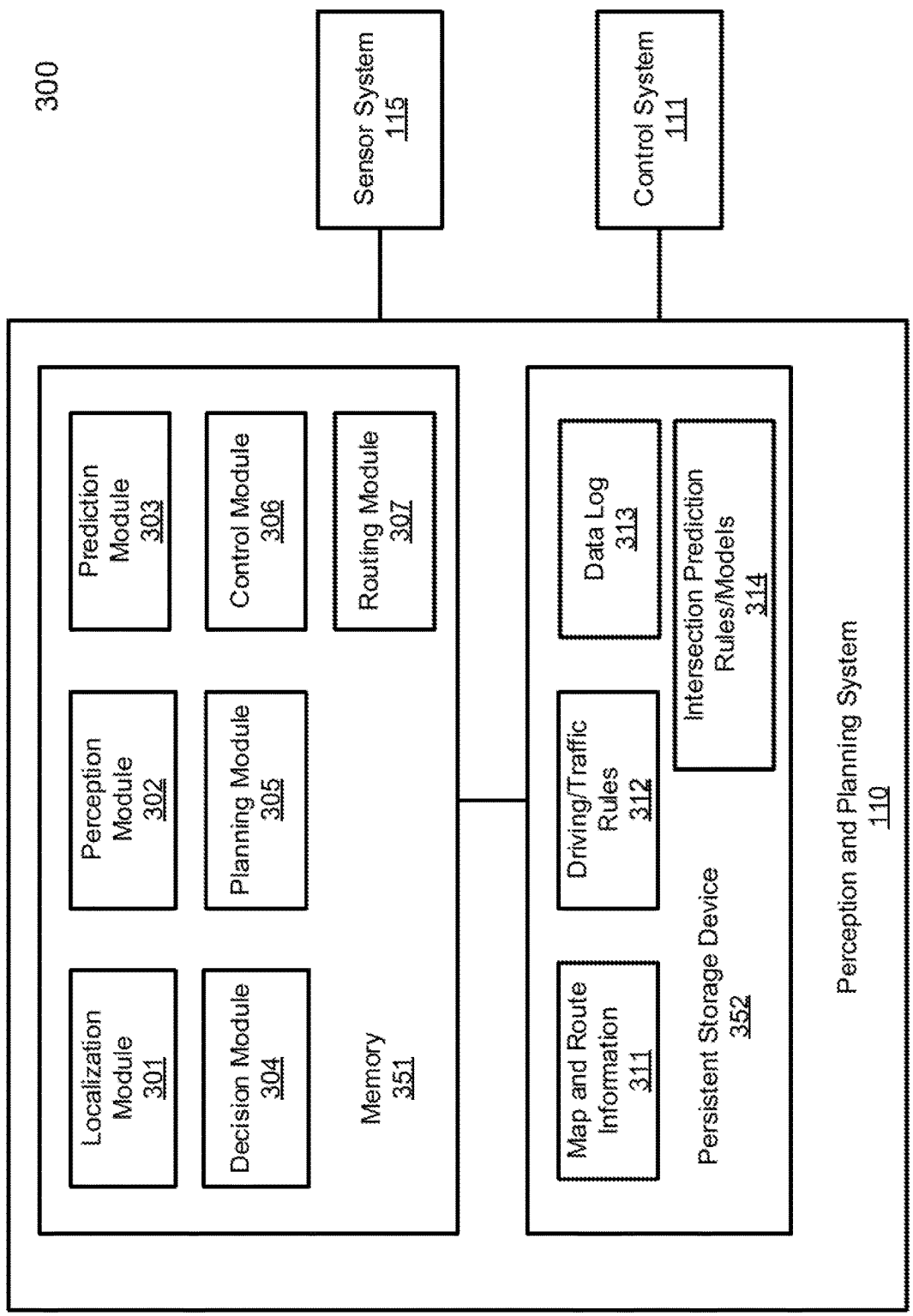
FIGS. 3A-3B are block diagrams illustrating an example of a perception and planning system used with an autonomous vehicle according to one embodiment.
Figure 3B:
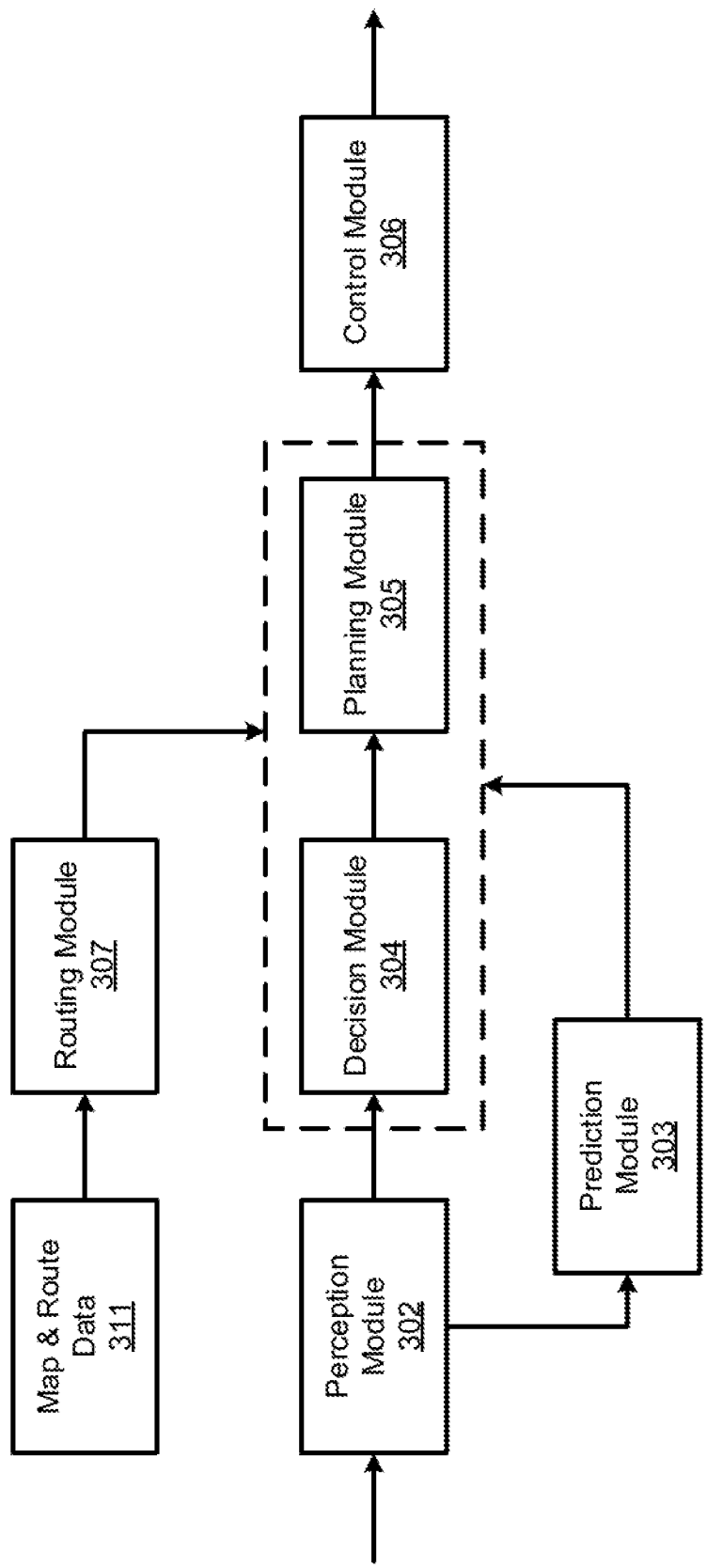

FIGS. 3A and 3B are block diagrams illustrating an example of a perception and planning system used with an autonomous vehicle according to one embodiment. System 300 may be implemented as a part of autonomous vehicle 101 of FIG. 1 including, but not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
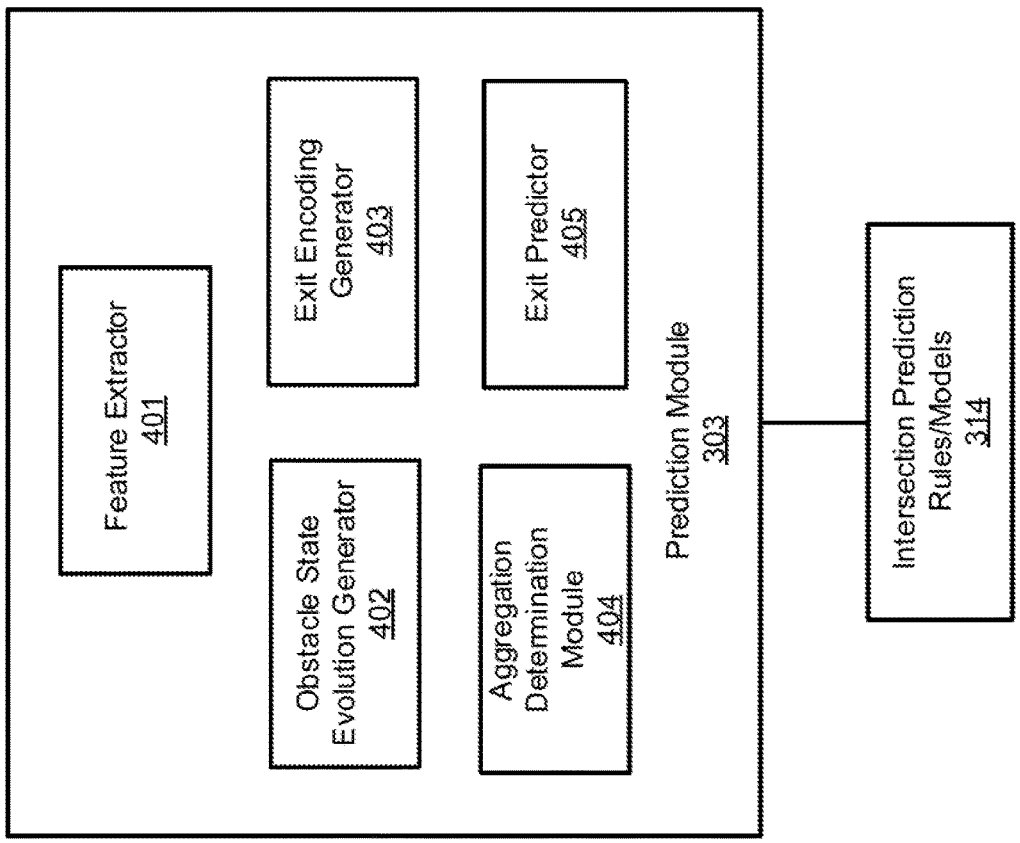
FIG. 4 is a block diagram illustrating an example of a prediction module according to one embodiment.
Figure 5:
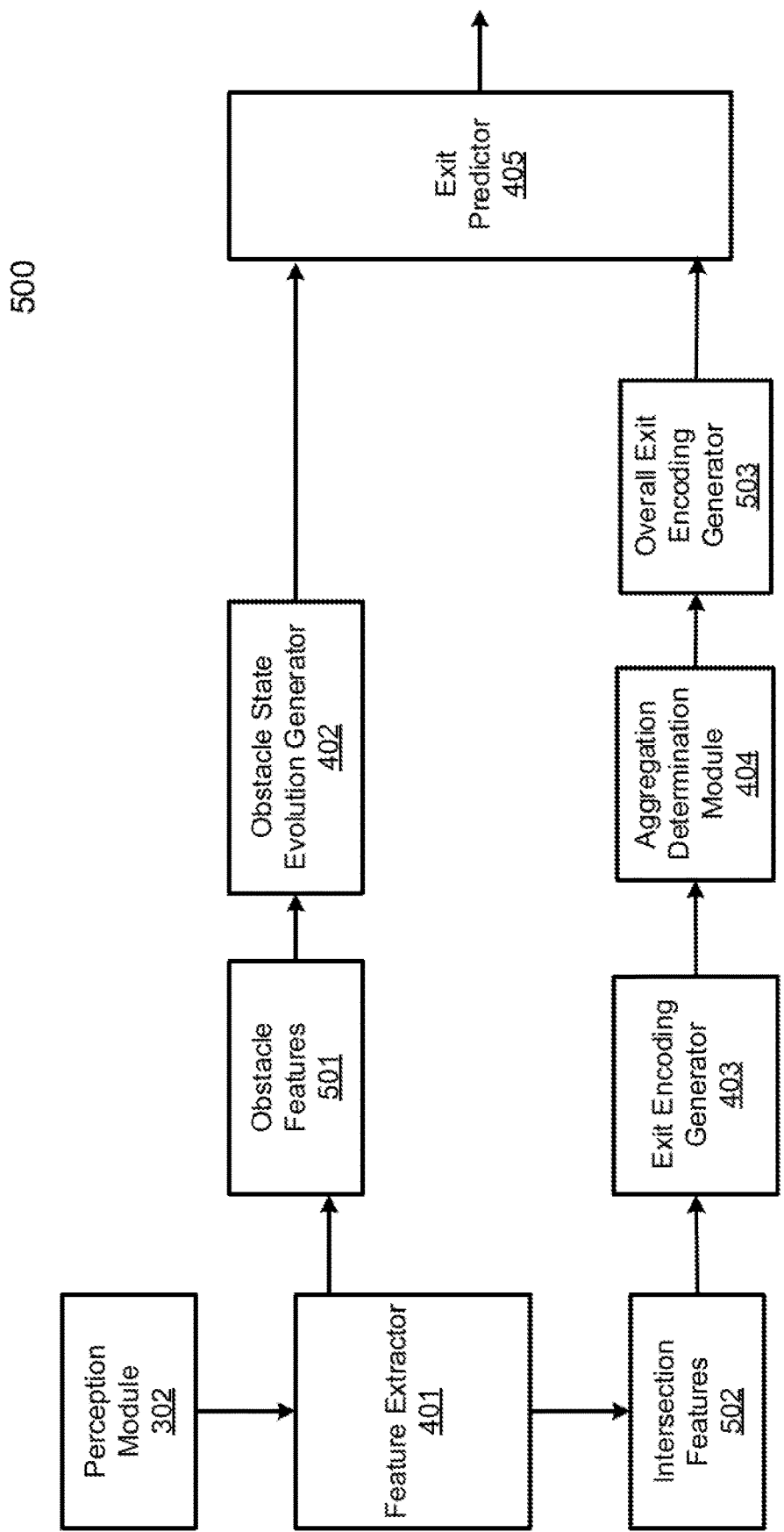
FIG. 5 is a processing flow diagram illustrating an example of predicting exits of an intersection according to one embodiment.

FIG. 4 is a block diagram 400 illustrating an example of a prediction module and FIG. 5 is a processing flow diagram 500 of a prediction module according to one embodiment. Referring to FIG. 4 and FIG. 5, prediction module 303 includes, but is not limited to, intersection feature extractor 401, obstacle state evolution generator 402, exit encoding generator 403, aggregation determination module 404, and exit predictor 405, which work together using intersection predictive algorithms or models 314 to determine or predict an exit of the intersection that a moving obstacle within the intersection most likely exits. Note that modules 401-405 may be integrated into fewer number of modules or a single module.

According to one embodiment, a moving obstacle such as a vehicle (or a bicycle, pedestrian) is identified within a predetermined proximity of an intersection having one or more exits. The moving obstacle and the intersection and the one or more exits may be identified as a part of perception process performed by perception module 302 based on sensor data obtained from various sensors mounted on an ADV such as the sensors as shown in FIG. 2. Based on the perception information, feature extractor 401 is configured to extract a set of features representing the intersection, including obstacle features 501 and intersection features 502. Alternatively, the features may be extracted and provided by perception module 302. A moving obstacle/object may be a vehicle, motorcycle, bicycle, or pedestrian. In this example, obstacle features 501 represent a moving obstacle that appears within a proximity of an intersection.

Based on obstacle features 501, obstacle state evolution generator 402 is configured to determine an obstacle state evolution of a spatial position of the moving obstacle over a period of time. In one embodiment, obstacle state evolution generator 402 may determine the obstacle state evolution of the spatial position of the moving obstacle over a period of time by using RNN. Based on intersection features 502, exit encoding generator 403 is configured to determine, for each of the one or more exits, an intersection exit encoding of the exit based on one or more exit features of the exit. In one embodiment, for each of the one or more exits, the one or more exit features includes a shape, or an angle of the exit. In one embodiment, exit encoding generator 403 may determine, for each of the one or more exits, the intersection exit encoding of the exit by using RNN.

Next, aggregation determination module 404 is configured to determine an aggregated exit encoding based on aggregating all of the intersection exit encodings for the one or more exits. For each of the one or more exits, overall exit encoding generator 503 is configured to determine an overall exit encoding of the exit based on the intersection exit encoding of the exit, the aggregated exit encoding, and the obstacle state evolution. For each exit of the one or more exits, exit predictor 405 calculates an exit probability of the exit that the moving obstacle likely exits the intersection through the exit based on the obstacle state evolution and the aggregated exit encoding. In one embodiment, exit predictor 405 may determine, for each of the one or more exits, the exit probability of the exit further based on the overall exit encoding of the exit. Thereafter, a trajectory of the ADV is planned by planning module 305 to navigate through the intersection to avoid a collision with the moving obstacle based on the exit probabilities of the exits of the intersection. The above process is iteratively performed for each of the moving obstacles detected within the proximity of the intersection.

Figure 6:
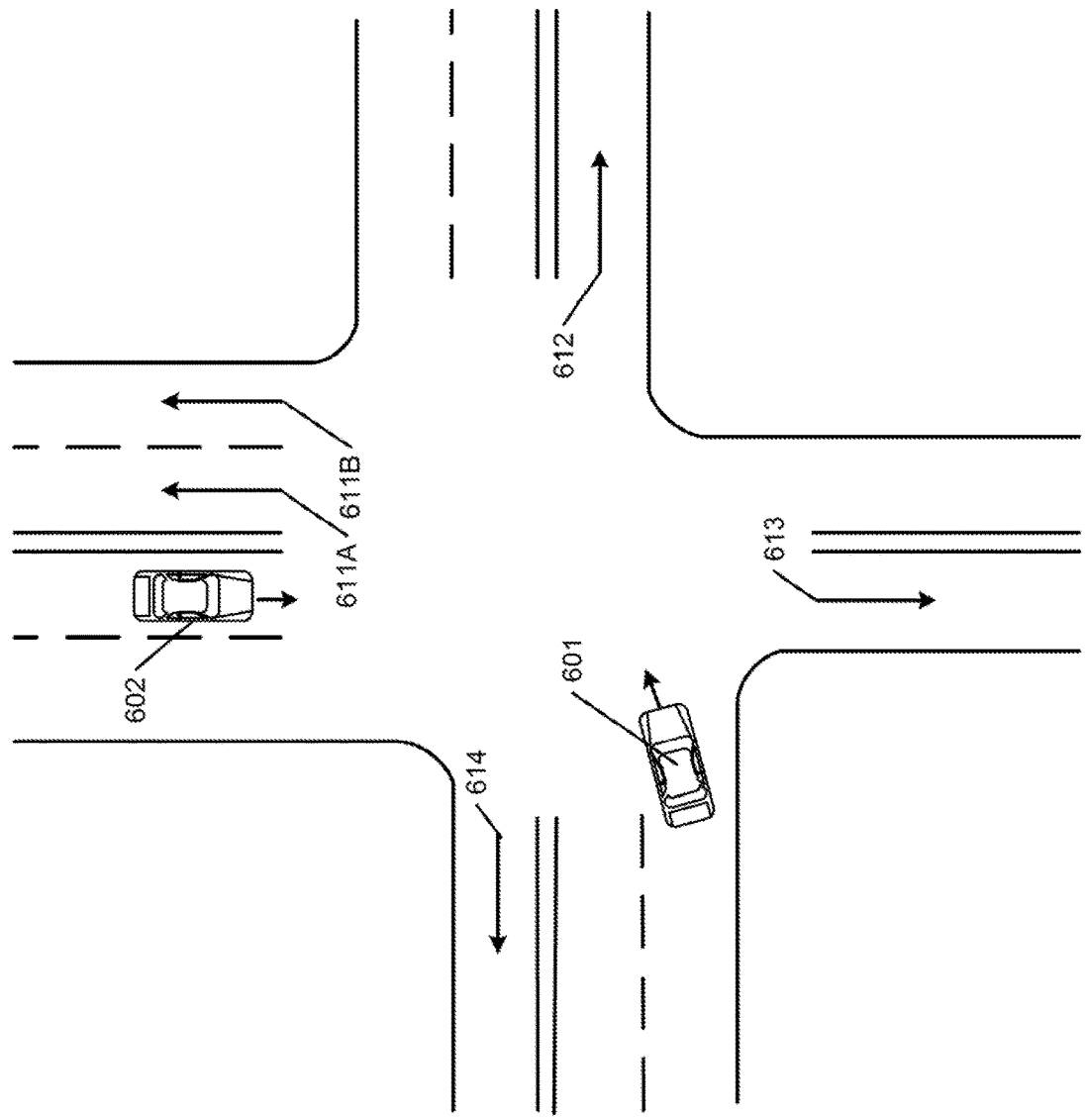
FIG. 6 shows an example of an intersection.

Referring now to FIG. 6, in this example, intersection 600 includes one or more exits, for example, exits 611A, 611B, 612, 613, and 614. A moving obstacle/object, in this example, vehicle 601, is within a predetermined proximity of intersection 600 moving in a particular direction with a particular speed. A moving obstacle/object may be a vehicle, motorcycle, bicycle, or pedestrian.

An ADV or autonomous driving system needs to be able to have a good comprehension of the surrounding environment. The ADV should be able to predict an intention and/or future trajectory of surrounding moving obstacles, and take that into consideration for planning a moving trajectory of the ADV. However, the intention of surrounding moving obstacles, for example, near intersections, may be affected by many factors and may be hard to estimate. There may be a need to develop a method for predicting which exit a moving obstacle is going to select near an intersection by using a deep-learning model.

When planning a path for an ADV, for example, ADV 602 as illustrated in FIG. 6, it is important to accurately predict which exit of the exits (e.g., 611A, 611B, 612, 613, and 614) the moving obstacle 601 will most likely select. Which exit of the exits the moving object 601 will select may significantly affect how the ADV 602 will move to avoid a collision with the moving obstacle 601.

In this example, the moving obstacle 601 may exit through exits 611A, 611B, 612, and 613, and the moving obstacle 601 may make a U-turn and exit through exit 614. In some previous prediction models, a space of an intersection may be divided evenly into a plurality of pieces, an exit probability of exit for each piece may be predicted. For example, the space may be divided evenly into 12 pieces, each with angle=30 degrees, and a mask may be used to represent whether there is an exit in each piece. However, as illustrated in FIG. 6, there may be two exits in a same or similar direction, e.g., exits 611A and 611B. Because the two exits in the same or similar direction, e.g., exits 611A and 611B, may fall into a same piece in the previous prediction models, the previous prediction models may not be able to accurately predict exit probabilities for the two exits. In addition, an intersection may have a non-typical shape. For example, the intersection may have an exit lane with a small angle from a non-exit lane, and the exit lane with the small angle and the non-exit lane may belong to a same piece in the previous prediction models. Thus, the previous prediction models may not be able to accurately predict an exit probability for the exit lane with the small angle.

Disclosed herein is a method for accurately predicting an exit probability of the exit that the moving obstacle 601 likely exits the intersection 600 through the exit. In the method, not only each single exit's feature but the features of all possible exits (e.g., 611A, 611B, 612, 613, and 614) are aggregated together. The exit probability of each exit that the moving obstacle 601 likely exits may be determined based on the features about the moving obstacle and the aggregated features of all possible exits. By aggregated the features of all possible exits, the exit probability of each exit may be predicted accurately. Thereafter, the ADV 602 may plan a trajectory to control the ADV 602 to navigate through the intersection 600 to avoid a collision with the moving obstacle 601 based on the exit probabilities of the exits of the intersection 600.

Figure 7A:
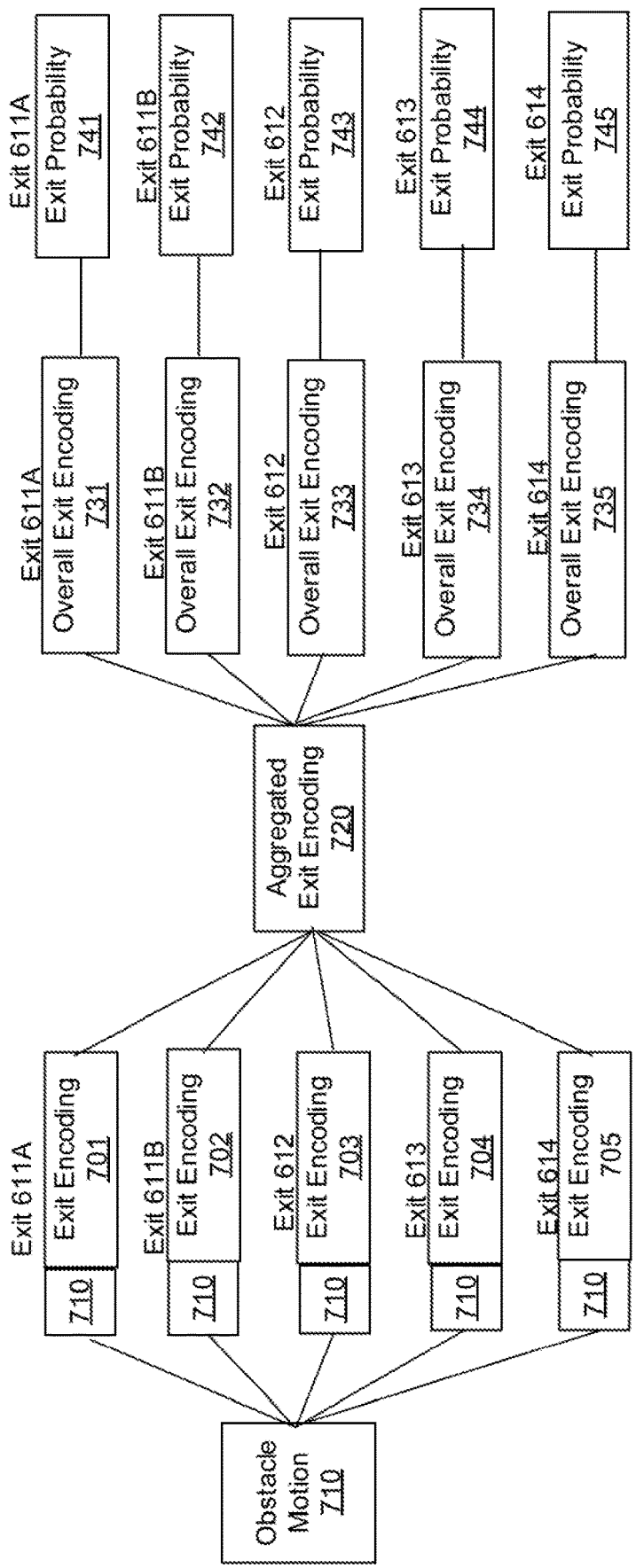
FIGS. 7A-7B show examples of processes of predicting exits of an intersection according to certain embodiments.
Figure 7B:
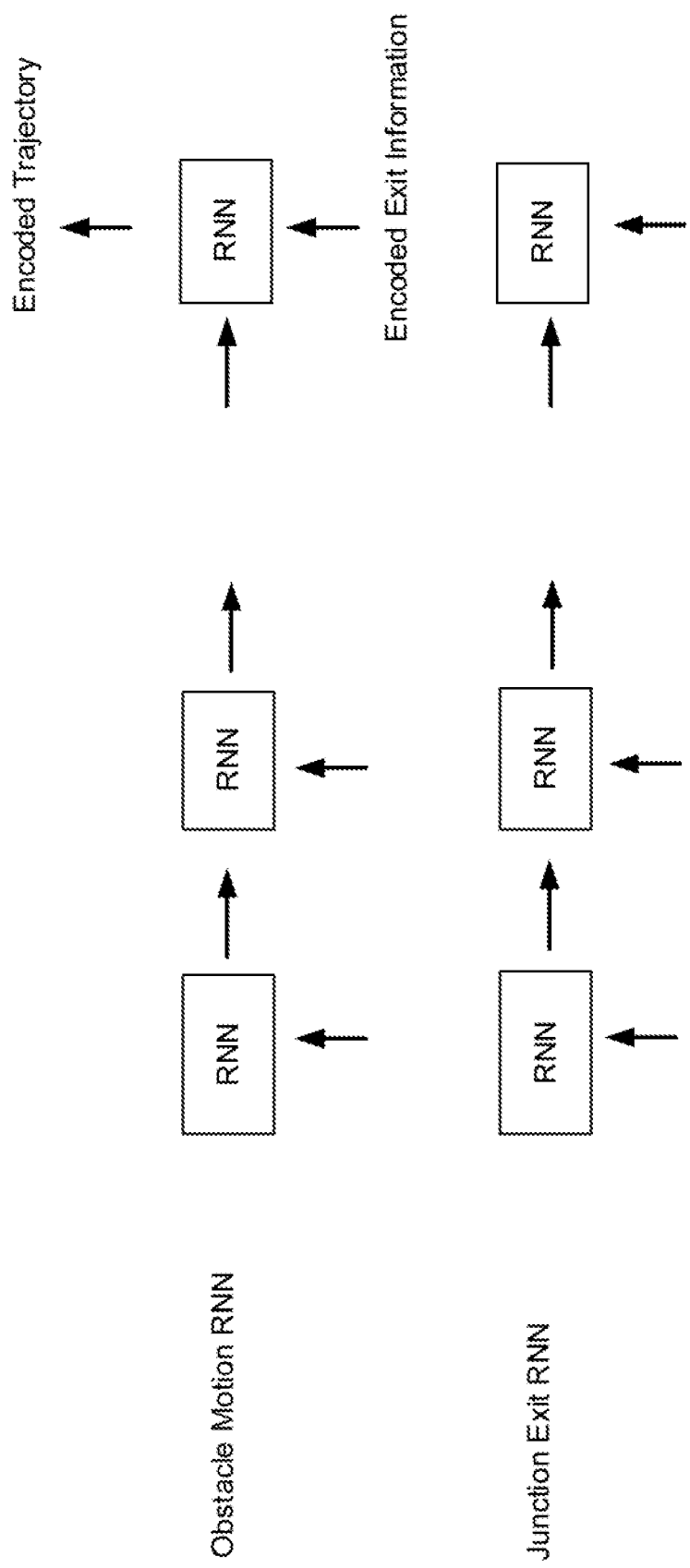

FIGS. 7A-7B show examples of processes of predicting exits of an intersection according to certain embodiments. Referring to FIGS. 6 and 7A, the moving obstacle 601 and the intersection 600 with the one or more exits (e.g., 611A, 611B, 612, 613, and 614) may be identified by the perception module 302 of the ADV 602. A set of features representing the intersection, including obstacle features and intersection features may be extracted. For example, features about the moving obstacle 601 itself may be obtained or extracted. For example, a motion history of the moving obstacle 601 may be extracted. Intersection exit features may also be obtained or extracted. For example, the intersection exit features may include a shape of the exit, an angle of the exit, a direction of the exit, a starting point of the exit, a few lane points of the exit, etc. Referring back to FIG. 5, the intersection exit features and the obstacle features may be fed into an input layer of an exit predictive model (not shown). The output of the exit predictive model may include an indication indicating which of the exits the moving obstacle most likely exits. For example, for each of the exits, a probability of which the moving obstacle may exit may be determined. An exit with the highest probability represents the exit of the intersection through which the moving obstacle most likely exits the intersection.

Referring to FIGS. 7A-7B, an obstacle state evolution of a spatial position of the moving obstacle 601 over a period of time may be obtained. In one embodiment, the obstacle state evolution of the spatial position of the moving obstacle over the period of time may be determined by using recurrent neural network (RNN). An RNN is a class of artificial neural networks where connections between nodes form a directed graph along a temporal sequence. This allows RNN to exhibit temporal dynamic behavior. Unlike feedforward neural networks, RNN can use an internal state (memory) to process sequences of inputs. RNN can be used to process sequential data. In this example, RNN may be used to encode the moving obstacle 601's motion history to determine the obstacle motion encoding or the state evolution 710. A moving obstacle's movement is a form of sequential data, and it is in part governed by, especially in short term, kinematics and vehicle dynamics. For example, the moving obstacle can't complete a sharp turn instantaneously; nor can it slow down from 60 mph to 0 in a blink. Therefore, the RNN network may be used to learn this underlying driving force. The obstacle motion encoding 710 may represent the obstacle state evolution of the spatial position of the moving obstacle 601.

Referring to FIGS. 6 and 7A, for the moving obstacle 601 near the intersection 600, there may be five possible exits 611A, 611B, 612, 613, and 614. For each possible exit of the moving obstacle 601, a corresponding intersection exit encoding may be determined based on one or more intersection exit features of the corresponding exit. As illustrated in FIG. 6, for exits 611A, 611B, 612, 613, and 614, intersection exit encodings 701, 702, 703, 704 and 705 may be determined based on intersection exit features of the exits 611A, 611B, 612, 613, and 614, respectively. As an example, the intersection exit encoding of the exit may contain information about the direction of the exit, the starting point of the exit, and/or the few lane points of the exit. In one embodiment, for each of the exits (e.g., 611A, 611B, 612, 613, 614), the intersection exit encoding (e.g., 701, 702, 703, 704, 705) of the exit may be determined by using RNN.

As illustrated in FIG. 7A, an aggregated exit encoding 720 may be determined by aggregating all of the intersection exit encodings (e.g., 701, 702, 703, 704, 705) for the exits (e.g., 611A, 611B, 612, 613, 614). In one embodiment, an aggregated exit encoding 720 may be determined by using an attention mechanism. In the attention mechanism, an attention score for each exit may be determined. In one embodiment, the attention score for each exit may be determined based on the intersection exit features of the corresponding exit. For example, the attention score for each exit may be determined based on at least one of the intersection exit features of the exit, or the intersection exit encoding of the exit. In one embodiment, the attention score for each exit may be determined by using a Multi-Layer Perceptron (MLP) network. MLP network is a class of feedforward artificial neural network. MLP network may include at least three layers of nodes: an input layer, a hidden layer and an output layer. MLP may utilize a supervised learning technique called backpropagation for training. In one embodiment, the aggregated exit encoding 720 may be determined by taking a weighted sum of each exit's intersection exit encoding (e.g., 701, 702, 703, 704, 705), with the weights being the normalized attention scores of the exits. For example, a weight for each of the one or more exits may be based on the attention score of the exit. The resulting aggregated exit encoding 720 may contain a learned encoding of an intention of a driver of the moving obstacle 601.

Referring to FIG. 7A, for each of the one or more exits, an overall exit encoding (e.g., 731, 731, 733, 734, 735) of the exit may be determined based on the intersection exit encoding (e.g., 701, 702, 703, 704, or 705) of the exit, the aggregated exit encoding 720, and the obstacle state evolution 710. In one embodiment, the overall exit encoding (e.g., 731, 731, 733, 734, 735) for each of the one or more exits may be determined by appending the aggregated encoding 720, as well as the obstacle motion encoding 710, to each intersection exit's encoding (e.g., 701, 702, 703, 704, 705). For example, for the exit 611A, the overall exit encoding 731 for the exit may be determined by appending the aggregated encoding 720, as well as the obstacle motion encoding 710, to the intersection exit's encoding 701.

For each exit of the one or more exits, an exit probability (e.g., 741, 741, 743, 744, 745) of the exit that the moving obstacle 601 likely exits the intersection 600 through the exit may be determined based on the overall exit encoding (e.g., 731, 731, 733, 734, 735) of the exit. For example, a softmax function may be performed on all of the overall exit encodings (e.g., 731, 731, 733, 734, 735) to get the exit probability (e.g., 741, 741, 743, 744, 745) that the moving obstacle 601 may select each exit to leave the intersection. The softmax function is a function that takes as input a vector of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities. The softmax may be used in neural networks, to map the non-normalized output of a network to a probability distribution over predicted output classes.

Thereafter, a trajectory of the ADV 602 is planned to navigate through the intersection 600 to avoid a collision with the moving obstacle 601 based on the exit probabilities (e.g., 741, 741, 743, 744, 745) of the exits (e.g., 611A, 611B, 612, 613, 614) of the intersection 600. The above process is iteratively performed for each of the moving obstacles detected within the proximity of the intersection.

Figure 8:
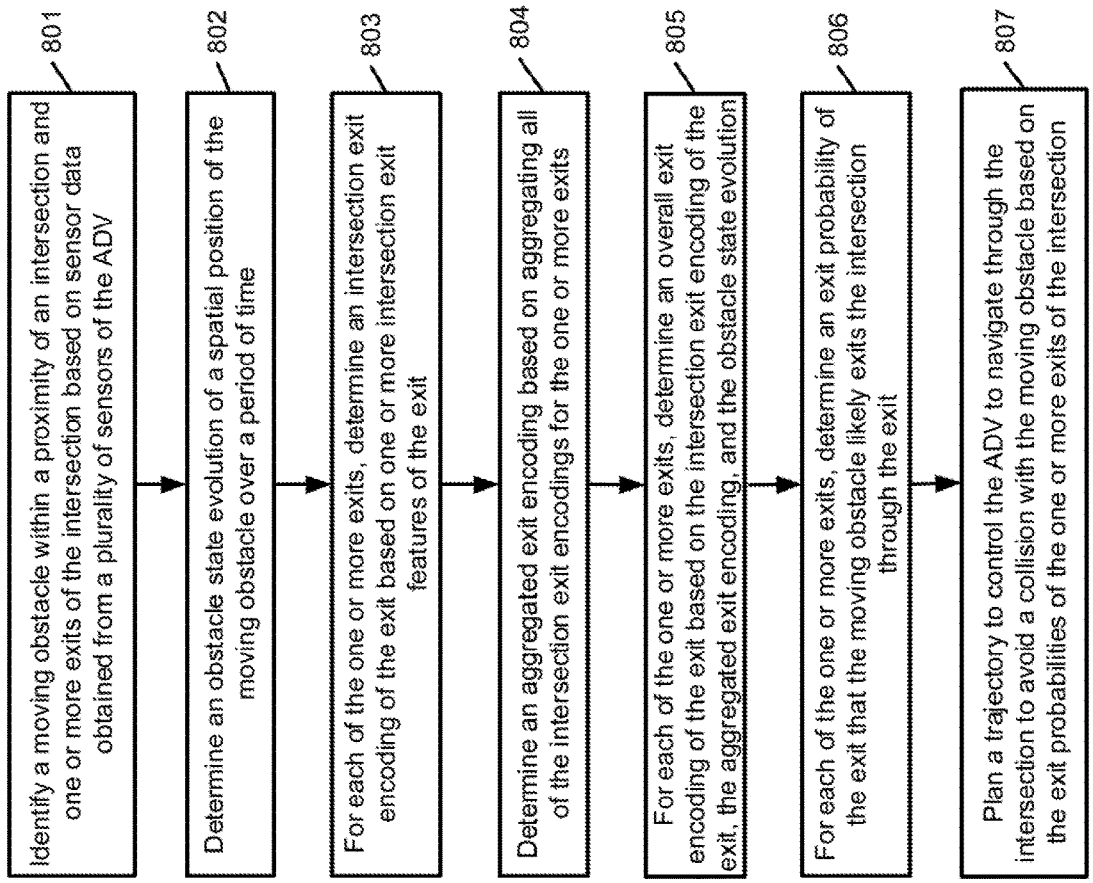
FIG. 8 is a flow diagram illustrating an example of a process for predicting exits of an intersection for operating an ADV according to one embodiment.

FIG. 8 is a flow diagram illustrating a process of predicting an exit of an intersection a moving obstacle likely takes for operating an ADV according to one embodiment. Process 800 may be performed by processing logic which may include software, hardware, or a combination thereof. For example, process 800 may be performed by prediction module 303. Referring to FIG. 8, in operation 801, processing logic identifies a moving obstacle (e.g., vehicles, motorcycles, bicycles, pedestrians) within a proximity of an intersection and one or more exits of the intersection based on sensor data obtained from a plurality of sensors of the ADV. For example, the processing logic may perceive a driving environment surrounding the ADV based on sensor data obtained from various sensors mounted on the ADV (e.g., LIDAR, RADAR, cameras) and generates perception data describing the driving environment. The processing logic may identify the moving obstacle and the one or more exits of the intersection based on the perception data. In operation 802, the processing logic determines an obstacle state evolution of a spatial position of the moving obstacle over a period of time. In operation 803, for each of the one or more exits, the processing logic determines the intersection exit encoding of the exit based on one or more intersection exit features of the exit.

In operation 804, the process logic determines an aggregated exit encoding based on aggregating all of the intersection exit encodings for the one or more exits. For example, referring back to FIG. 6 and FIG. 7A, an aggregated exit encoding 720 may be determined by aggregating all of the intersection exit encodings (e.g., 701, 702, 703, 704, 705) for the exits (e.g., 611A, 611B, 612, 613, 614). For example, an attention score for each exit may be determined based on at least one of the intersection exit features of the exit, or the intersection exit encoding of the exit. In one embodiment, the attention score for each exit may be determined by using an MLP network. In one embodiment, the aggregated exit encoding 720 may be determined by taking a weighted sum of each exit's intersection exit encoding (e.g., 701, 702, 703, 704, 705), wherein a weight for each of the one or more exits is based on the attention score of the exit. The resulting aggregated exit encoding 720 contains a learned encoding of an intention of a driver of the moving obstacle 601. In operation 805, for each of the one or more exits, the process logic may determine an overall exit encoding of the exit based on the intersection exit encoding of the exit, the aggregated exit encoding, and the obstacle state evolution.

In operation 806, for each of the exits of the intersection, the process logic determines an exit probability of the exit that the moving object likely exits the intersection through the exit based on the obstacle state evolution and the aggregated exit encoding. In one embodiment, for each of the one or more exits, the process logic may determine the exit probability of the exit further based on the overall exit encoding of the exit. In operation 807, a trajectory of the ADV is planned to control the ADV to navigate through the intersection and to avoid a collision with the moving obstacle based on the exit probabilities of the exits of the intersections associated with the moving obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
identifying, by a processor, a moving obstacle within a proximity of an intersection and one or more exits of the intersection based on sensor data obtained from a plurality of sensors of the ADV;
determining, by the processor, an obstacle state evolution of a spatial position of the moving obstacle over a period of time;
for each of the one or more exits, determining, by the processor, an intersection exit encoding of the exit based on one or more intersection exit features of the exit;
determining, by the processor, an aggregated exit encoding based on aggregating all of the intersection exit encodings for the one or more exits;
for each of the one or more exits, determining, by the processor, an exit probability of the exit that the moving obstacle likely exits the intersection through the exit based on the obstacle state evolution and the aggregated exit encoding;
planning, by the processor, a trajectory based on the exit probabilities of the one or more exits of the intersection; and
controlling, by the processor, the ADV to navigate through the intersection according to the trajectory to avoid a collision with the moving obstacle.

2. The method of claim 1, wherein, for each of the one or more exits, the one or more intersection exit features includes at least one of a shape of the exit, an angle of the exit, a direction of the exit, a starting point of the exit, or a few lane points of the exit.

3. The method of claim 1, wherein the obstacle state evolution of the spatial position of the moving obstacle over the period of time is determined by using recurrent neural network (RNN).

4. The method of claim 1, for each of the one or more exits, wherein the intersection exit encoding of the exit is determined by using recurrent neural network (RNN).

5. The method of claim 1, further comprising, for each of the one or more exits, determining an overall exit encoding of the exit based on the intersection exit encoding of the exit, the aggregated exit encoding, and the obstacle state evolution.

6. The method of claim 5, for each of the one or more exits, wherein the exit probability of the exit is determined further based on the overall exit encoding of the exit.

7. The method of claim 1, further comprising, for each of the one or more exits, determining an attention score of the exit based on at least one of the intersection exit features of the exit, or the intersection exit encoding of the exit.

8. The method of claim 7, wherein the aggregated exit encoding is based on a weighted sum of the intersection exit encoding for each of the one or more exits, wherein a weight for each of the one or more exits is based on the attention score of the exit.

9. A non-transitory machine-readable medium having instructions stored therein, which when executed by a processor, cause the processor to perform operations, the operations comprising:
   identifying a moving obstacle within a proximity of an intersection and one or more exits of the intersection based on sensor data obtained from a plurality of sensors of the ADV;
   determining an obstacle state evolution of a spatial position of the moving obstacle over a period of time;
   for each of the one or more exits, determining an intersection exit encoding of the exit based on one or more intersection exit features of the exit;
   determining an aggregated exit encoding based on aggregating all of the intersection exit encodings for the one or more exits;
   for each of the one or more exits, determining an exit probability of the exit that the moving obstacle likely exits the intersection through the exit based on the obstacle state evolution and the aggregated exit encoding;
   planning a trajectory based on the exit probabilities of the one or more exits of the intersection; and
   controlling the ADV to navigate through the intersection according to the trajectory to avoid a collision with the moving obstacle.

10. The non-transitory machine-readable medium of claim 9, wherein, for each of the one or more exits, the one or more intersection exit features includes at least one of a shape of the exit, an angle of the exit, a direction of the exit, a starting point of the exit, or a few lane points of the exit.

11. The non-transitory machine-readable medium of claim 9, wherein the obstacle state evolution of the spatial position of the moving obstacle over the period of time is determined by using recurrent neural network (RNN).

12. The non-transitory machine-readable medium of claim 9, wherein, for each of the one or more exits, where the intersection exit encoding of the exit is determined by using recurrent neural network (RNN).

13. The non-transitory machine-readable medium of claim 9, wherein the operations further comprise, for each of the one or more exits, determining an overall exit encoding of the exit based on the intersection exit encoding of the exit, the aggregated exit encoding, and the obstacle state evolution, and wherein the exit probability of the exit is determined further based on the overall exit encoding of the exit.

14. The non-transitory machine-readable medium of claim 9, wherein the operations further comprise, for each of the one or more exits, determining an attention score of the exit based on at least one of the intersection exit features of the exit, or the intersection exit encoding of the exit.

15. The non-transitory machine-readable medium of claim 14, wherein the aggregated exit encoding is based on a weighted sum of the intersection exit encoding for each of the one or more exits, wherein a weight for each of the one or more exits is based on the attention score of the exit.

16. A data processing system, comprising:
    a processor; and
    a memory coupled to the processor to store instructions, which when executed by the processor, cause the processor to perform operations, the operations including
      identifying a moving obstacle within a proximity of an intersection and one or more exits of the intersection based on sensor data obtained from a plurality of sensors of the ADV;
      determining an obstacle state evolution of a spatial position of the moving obstacle over a period of time;
      for each of the one or more exits, determining an intersection exit encoding of the exit based on one or more intersection exit features of the exit;
      determining an aggregated exit encoding based on aggregating all of the intersection exit encodings for the one or more exits;
      for each of the one or more exits, determining an exit probability of the exit that the moving obstacle likely exits the intersection through the exit based on the obstacle state evolution and the aggregated exit encoding; and
      planning a trajectory based on the exit probabilities of the one or more exits of the intersection; and
      controlling the ADV to navigate through the intersection according to the trajectory to avoid a collision with the moving obstacle.

17. The data processing system of claim 16, wherein, for each of the one or more exits, the one or more intersection exit features includes at least one of a shape of the exit, an angle of the exit, a direction of the exit, a starting point of the exit, or a few lane points of the exit.

18. The data processing system of claim 16, wherein the obstacle state evolution of the spatial position of the moving obstacle over the period of time is determined by using recurrent neural network (RNN).

19. The data processing system of claim 16, wherein, for each of the one or more exits, where the intersection exit encoding of the exit is determined by using recurrent neural network (RNN).

20. The data processing system of claim 16, wherein the operations further include, for each of the one or more exits, determining an overall exit encoding of the exit based on the intersection exit encoding of the exit, the aggregated exit encoding, and the obstacle state evolution, and wherein the exit probability of the exit is determined further based on the overall exit encoding of the exit.

21. The data processing system of claim 16, wherein the operations further include, for each of the one or more exits, determining an attention score of the exit based on at least one of the intersection exit features of the exit, or the intersection exit encoding of the exit.

22. The data processing system of claim 21, wherein the aggregated exit encoding is based on a weighted sum of the intersection exit encoding for each of the one or more exits, wherein a weight for each of the one or more exits is based on the attention score of the exit.

* * * * *